United States Patent
Semple et al.

(10) Patent No.: US 10,208,755 B2
(45) Date of Patent: Feb. 19, 2019

(54) MAGNETIC COUPLING FOR MOTOR DRIVE SHAFT OF ELECTRICAL SUBMERSIBLE PUMP

(71) Applicant: Baker Hughes Incorporated, Houston, TX (US)

(72) Inventors: Ryan P. Semple, Owasso, OK (US); Arturo L. Poretti, Claremore, OK (US); David Tanner, Broken Arrow, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 571 days.

(21) Appl. No.: 14/817,344

(22) Filed: Aug. 4, 2015

(65) Prior Publication Data
US 2016/0040675 A1    Feb. 11, 2016

Related U.S. Application Data

(60) Provisional application No. 62/034,888, filed on Aug. 8, 2014.

(51) Int. Cl.
*F04D 13/02* (2006.01)
*F04D 13/10* (2006.01)
(Continued)

(52) U.S. Cl.
CPC ......... *F04D 13/027* (2013.01); *F04D 13/024* (2013.01); *F04D 13/026* (2013.01);
(Continued)

(58) Field of Classification Search
CPC .... F04D 13/024; F04D 13/026; F04D 13/027; F04D 13/086; F04D 13/10; F04D 25/026;
(Continued)

(56) References Cited

U.S. PATENT DOCUMENTS 3,936,683 A * 2/1976 Walker ................. H02K 49/106
310/103
4,115,040 A * 9/1978 Knorr .................. H02K 49/106
464/29
(Continued)

FOREIGN PATENT DOCUMENTS

CN    102664512 B    1/2014
GB    2037364 A    7/1980
(Continued)

OTHER PUBLICATIONS

Reciprocating Submersible Pump Improves Oil Production, JPT—Jul. 2012—www.jptonline.org.
(Continued)

*Primary Examiner* — Josh Skroupa
(74) *Attorney, Agent, or Firm* — Bracewell LLP; James E. Bradley

(57) ABSTRACT

An electrical submersible pump assembly has a magnetic coupling between the motor shaft and the pump shaft. The coupling includes motor shaft disks mounted to the motor shaft, each having upward and downward facing disk surfaces joined by an outward facing disk cylindrical surface. Motor shaft magnets are mounted in each of the disk cylindrical surfaces and in the upward and downward facing disk surfaces. A pump shaft rotor mounted to the pump shaft has annular bands axially separated from each other by recesses into which the disks extend. Rotor magnets are mounted in each of the recess cylindrical surfaces and in upward and downward facing band surfaces. The magnets in the recesses interact with the magnets on the disks.

19 Claims, 3 Drawing Sheets

(51) Int. Cl.
  *F04D 25/02* (2006.01)
  *H02K 5/128* (2006.01)
  *H02K 49/10* (2006.01)
  *F04D 13/08* (2006.01)

(52) U.S. Cl.
  CPC .......... *F04D 13/086* (2013.01); *F04D 13/10* (2013.01); *F04D 25/026* (2013.01); *H02K 5/1285* (2013.01); *H02K 49/106* (2013.01); *H02K 49/108* (2013.01); *Y10T 464/30* (2015.01)

(58) Field of Classification Search
  CPC ...... F16D 27/01; H02K 5/128; H02K 5/1285; H02K 49/104; H02K 49/106; H02K 49/108; H02K 2005/1287; Y10T 464/30
  USPC .................... 464/29; 417/420; 310/103, 104; 192/54.4, 84.3
  See application file for complete search history.

(56) References Cited

U.S. PATENT DOCUMENTS

| | | | |
|---|---|---|---|
| 4,272,226 A | 6/1981 | Osborne | |
| 4,687,054 A | 8/1987 | Russell et al. | |
| 5,090,944 A * | 2/1992 | Kyo .................... | B01F 13/0863 464/29 |
| 5,326,323 A * | 7/1994 | Krampitz .................. | G01F 3/10 464/29 |
| 5,690,519 A * | 11/1997 | Chen .................... | H02K 49/106 417/420 |
| 5,691,587 A * | 11/1997 | Lamb .................. | H02K 49/046 310/103 |
| 5,708,313 A * | 1/1998 | Bowes ................. | H02K 49/106 417/420 |
| 5,712,520 A * | 1/1998 | Lamb .................. | H02K 49/046 310/102 A |
| 5,734,209 A | 3/1998 | Hallidy | |
| 5,779,013 A * | 7/1998 | Bansbach ............... | F16D 37/02 192/21.5 |
| 5,831,353 A | 11/1998 | Bolding et al. | |
| 6,015,270 A | 1/2000 | Roth | |
| 6,155,792 A | 12/2000 | Hartley et al. | |
| 6,283,720 B1 | 9/2001 | Kottke | |
| 6,863,124 B2 | 3/2005 | Araux et al. | |
| 6,926,504 B2 | 8/2005 | Howard | |
| 7,112,904 B2 * | 9/2006 | Akiyama ............. | H02K 49/106 310/103 |
| 7,445,435 B2 | 11/2008 | Howard | |
| 7,508,104 B2 * | 3/2009 | Schmidt ............... | H02K 49/102 310/103 |
| 7,535,143 B2 * | 5/2009 | Romagny ................ | B60K 6/26 310/112 |
| 7,549,467 B2 | 6/2009 | McDonald et al. | |
| 8,808,096 B2 * | 8/2014 | Atkins .................... | F16F 15/30 464/29 |
| 9,145,894 B2 * | 9/2015 | Hoshi ................. | F04D 13/0633 |
| 9,178,405 B2 * | 11/2015 | Flanigan .............. | H02K 49/106 |
| 9,444,318 B2 * | 9/2016 | Atallah ................ | H02K 49/106 |
| 9,685,851 B2 * | 6/2017 | Atallah ................ | H02K 49/102 |
| 2004/0234391 A1 | 11/2004 | Izraelev | |
| 2005/0089419 A1 | 4/2005 | Arauz et al. | |
| 2011/0057456 A1 * | 3/2011 | Atallah ................ | H02K 49/102 290/1 C |
| 2013/0123026 A1 * | 5/2013 | Purdy .................. | H02K 49/106 464/29 |
| 2014/0069629 A1 | 3/2014 | McCann et al. | |
| 2014/0105759 A1 | 4/2014 | Henry et al. | |

FOREIGN PATENT DOCUMENTS

| | | |
|---|---|---|
| GB | 2037364 B | 10/1982 |
| JP | 05-168221 A | 7/1993 |
| WO | 1998048034 A1 | 2/1998 |

OTHER PUBLICATIONS

Analytical Design of Permanent Magnet Radial Couplings, Romain Ravaud, Valerie Lemarquand and Guy Lemarquand, IEEE Transactions on Magnetics, vol. 46, No. 11, Nov. 2010, pp. 3860-3865.
Submerged Pumps and Expanders with Magnetic Coupling for Hazardous Applications, Vinod Patel and Steve Rush, Proceedings of the First Middle East Turbomachinery Symposium, Feb. 13-16, 2011, Doha, Qatar, pp. 1-8.
Torque Analysis and Measurements of Cylindrical Air-Gap Synchronous Permanent Magnet Couplings Based on Analytical Magnetic Field Calculations, Jang-Young Choi, Hyeon-Jae Shin, Seok-Myeong Jang, and Sung-Ho Lee, IEEE Transactions on Magnetics, vol. 49, No. 7, Jul. 2013, pp. 3921-3924.
U.S. Appl. No. 14/567,775, filed Dec. 11, 2014, entitled "Magnetic Coupling Unit for Submersible Well Pumps".
Australian Office Action dated Apr. 17, 2018 for corresponding Australian Patent Application No. 2015301156.
International Preliminary Report on Patentability dated Feb. 14, 2017 for corresponding PCT/US2015/043776.

\* cited by examiner

MAGNETIC COUPLING FOR MOTOR DRIVE SHAFT OF ELECTRICAL SUBMERSIBLE PUMP

CROSS REFERENCE TO RELATED APPLICATION

This application claims priority to provisional application Ser. No. 62/034,888, filed Aug. 8, 2014.

FIELD OF THE DISCLOSURE

This disclosure relates in general to electrical submersible pumps for wells and in particular to a magnetic coupling between the motor drive shaft and the drive shaft assembly extending to the pump.

BACKGROUND

Electrical submersible pumps (ESP) are commonly used to pump well fluid from hydrocarbon producing wells. A typical ESP has a centrifugal pump driven by an electrical motor. A pressure equalizer or seal section is usually located between the motor and the pump reduce a pressure difference between lubricant in the motor and the hydrostatic well fluid pressure. The motor drive shaft normally connects to a drive shaft in the seal section, which in turn connects to a pump shaft in the pump. One or more shaft seals at the upper end of the seal section seal against the entry of well fluid into the seal section. A typical shaft seal is a mechanical face seal having a runner that rotates and is biased against a stationary base. Well fluid seeps between the runner and the base to lubricate the interface between the base and runner.

Well fluid leaking into the seal section around the shaft seal can migrate into the lubricant in the motor, which eventually can be very damaging. An ESP may operate for several years in a well, and wear can occur to the shaft seal. Various proposals have been made over many years to inhibit leakage of well fluid into the motor, however, leakage past a shall seal remains a problem.

SUMMARY

An electrical submersible pomp assembly includes a rotary pump having a rotatably driven pump shaft. A motor having a motor shaft that is rotated by the motor extends along an axis of the pump assembly. A plurality of motor shaft disks are mounted to the portion of the motor shaft within a pressure equalizer for rotation therewith. The motor shaft disks are spaced axially apart from each other, each disk having first and second disk end walls joined by a disk cylindrical wall. A plurality of motor shaft magnets are mounted in the first and second disk end walls of each of the disks. A pump shall rotor mounted to the pump shaft for rotation therewith has a plurality of annular bands located between adjacent ones of the disks. Each of the annular bands has first and second band end walls joined by a band cylindrical wall. A plurality of magnets are mounted on the first and second band end walls of each of the bands to magnetically interact with the magnets on the second and first disk end walls, respectively, of each of the disks, to impart rotation of the motor shall to the rotor.

Preferably, the first and second disk end walls and the first and second band end walls are flat and perpendicular to the axis. The recess cylindrical walls have inner diameters greater than inner diameters of the band cylindrical walls. In the preferred embodiment, the disks and the bands have rectangular cross-sections when viewed in an axial section plane.

A magnetic coupling housing having a housing cylindrical wall extends around and is concentric with the rotor. The housing has a motor end adapter on one end of the housing cylindrical wall coupled to the motor and a pump end adapter on an another end of the housing cylindrical wall coupled to the pump. The motor shaft extends through an opening in the motor end adapter, and the pump shaft extends through an opening in the pump end adapter. A thrust bearing may be located at the opening in the motor and adapter and in engagement with the motor shaft. Another thrust bearing may be located at an intermediate location between the motor end adapter and the pump end adapter and in engagement with the motor shaft.

Axial gaps exist between the disk end walls and adjacent ones of the rotor end walls. Outer cylindrical gaps exist between the disk cylindrical walls and adjacent ones of the rotor cylindrical walls. Inner cylindrical gaps exist between the band cylindrical wall of each of the bands and the motor shaft. A non rotating shell of non ferrous material is located in the axial gaps and the inner and outer cylindrical gaps, separating the magnets on the disk first and second end walls from the magnets on the rotor second and first end walls, respectively. The shell has a sealed interior in fluid communication with lubricant in the motor.

The rotor has a plurality of annular recesses, each of the recesses receiving one of the disks. Each of the annular recesses has a recess cylindrical wall joining adjacent ones of the bands. Magnets on the disk cylindrical walls and on the recess cylindrical walls interact magnetically with each other to facilitate imparting rotation of the motor shaft to the pump shaft.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

DETAILED DESCRIPTION OF THE DISCLOSURE

Figure 1:
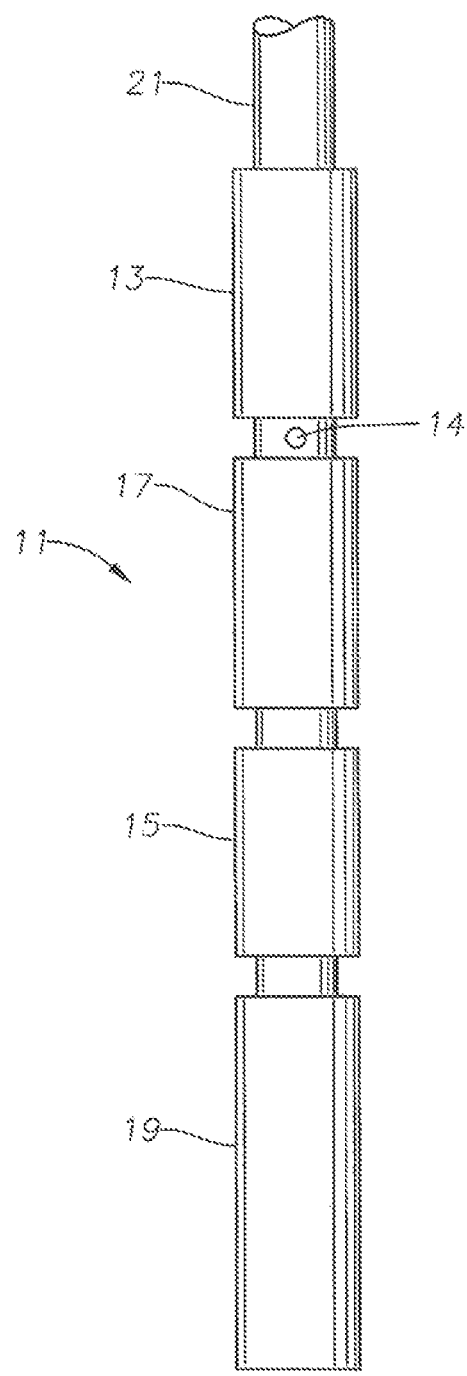
FIG. 1 is a side view of art electrical submersible pomp assembly in accordance with this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art in the drawings and specification, there have been disclosed illustrative embodiments and, although specific terms are employed, they are used in a generic and descriptive sense only and not for the purpose of limitation.

Referring to FIG. 1, electrical submersible pump (ESP) 11 is employed to pump well fluid, typically a mixture of oil and water. ESP 11 may be installed in a vertical portion or a horizontal or inclined portion of a well. The terms "upper", "lower" and the like are used only for convenience and not in a limiting manner.

In this example, ESP 11 includes a pump 13, which may be a centrifugal pump having a large number of stages, each stage having an impeller and a diffuser. Alternately, pump 13 could be another type, such as a progressing cavity pump. Pump 13 has an intake 14 for drawing in well fluid. A pressure equalizer or seal section 15 is illustrated as being connected to the lower end of a magnetic coupling 17, which in turn is connected to the lower end of pump 13 in this example. An electrical motor 19 secures to the lower end of seal section 15. Motor 19 is typically a three-phase motor filled with a dielectric lubricant. Seal section 15 has means, such as a flexible bag or bellows, for equalizing the pressure of the lubricant in motor 19 with the hydrostatic pressure of well fluid surrounding ESP 11. Seal section 15 could be below motor 19, rather than above, as shown. Magnetic coupling 17 may be a separate module mounted above or below seal section 15; alternately, magnetic coupling 17 could be located within a portion of seal section 15. In the example of FIG. 1 and unlike conventional seal sections, seal section 15 would not have a shaft seal at its upper end to seal around the drive shaft of motor 19.

Pump 13 discharges through production tubing 21 in this example. Alternately, production tubing 21 could comprise continuous coiled tubing, in which case pump 13 would discharge in the annulus surrounding the coiled tubing. If production tubing 21 is employed, a power cable (not shown) will be banded along production tubing 21 and connected with motor 19 to supply electrical power. The power cable could be located within coiled tubing, if coiled tubing is employed to support the weight of ESP 11, rather than production tubing 21. ESP 11 could include other modules, such as a gas separator, or additional pumps 13, seal sections 15 and motors 19 in tandem.

Figure 2:
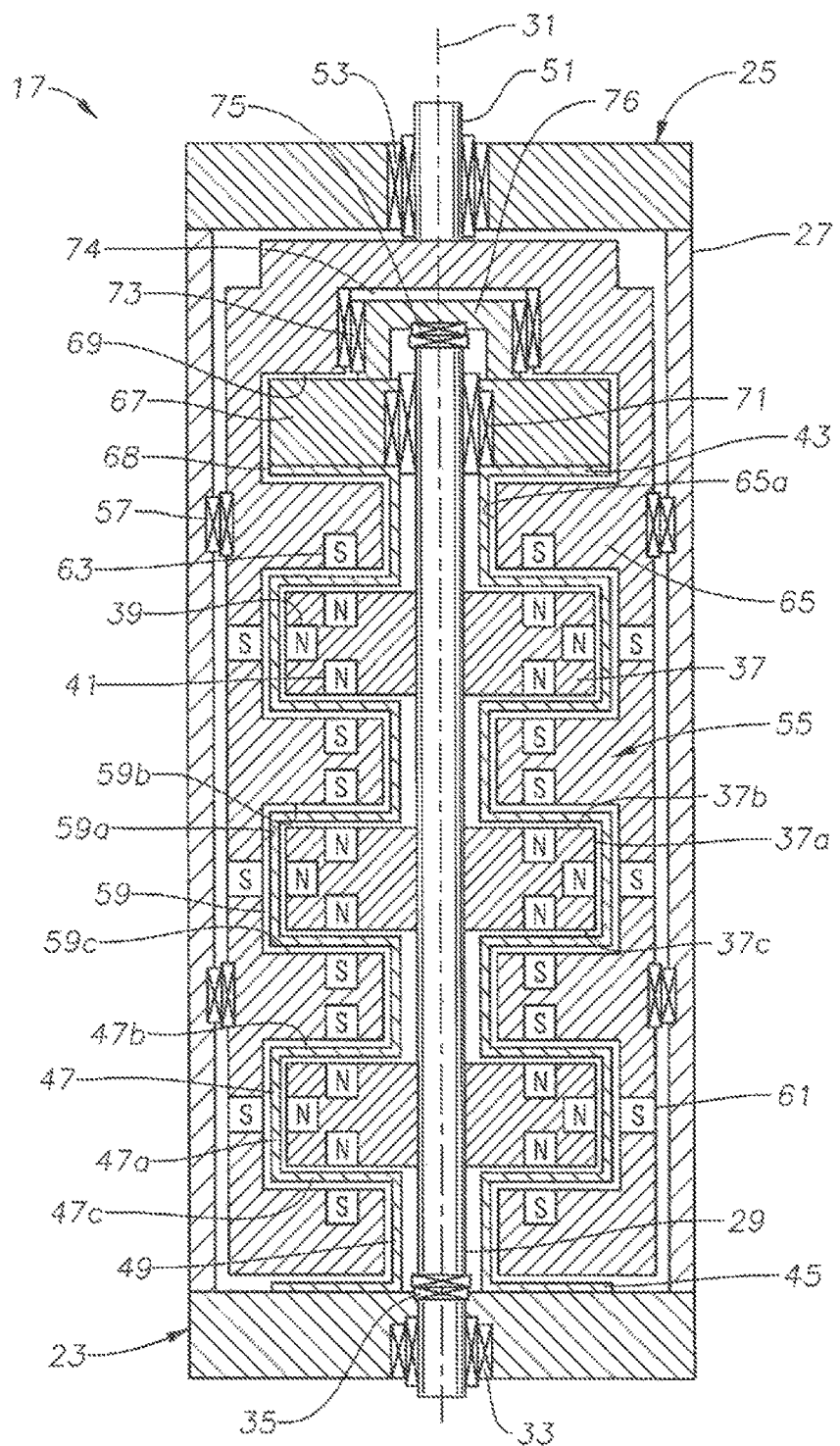
FIG. 2 is a cross sectional view of the magnetic coupling of the pomp assembly of FIG. 1.

Referring to FIG. 2, in this embodiment, magnetic coupling 17 comprises a separate module secured to other modules of ESP 11. Magnetic coupling 17 has a motor end adapter 23 to connect it to an upper end of seal section 15 in the configuration of FIG. 1. Motor end adapter 23 normally will be at the lower end of magnetic coupling 17, assuming ESP 11 is oriented vertically. Magnetic coupling 17 has a pump end adapter 25 on its other end, which is normally the upper end. In this example, pump end adapter 25 connects magnetic coupling 17 to the lower end of pump 13 (FIG. 1). A tabular housing 27 secures to and between motor end adapter 23 and pump end adapter 25.

A motor end shaft 29 extends from seal section 15 partially through housing 27 along axis 31. Motor end shaft 29 may be considered to be part of the motor shaft of motor 19. Motor end shaft 29 could be a single piece member extending from the shaft within seal section 15, or it could be coupled to the drive shaft within seal section 15 and another within motor 19 by splined couplings. Further, motor end shaft 29 within housing 27 could be in separate pieces threaded or splined together. A radial bearing 33 and an axial thrust bearing 35 in motor end adapter 23 provide support to motor end shaft 29. Radial bearing 33 and thrust bearing 35 do not form a seal between motor end shaft 29 and motor end adapter 23.

Motor end shaft 29 has a plurality of disks 37 axially and rotationally mounted to it for rotation therewith. Each disk 37 has a cylindrical surface or wall 37a that joins an upper end wall or upward facing surface 37b to a lower end wall or downward facing surface 37c. End walls 37b, 37c are parallel with each other; each may be flat and located in a plane perpendicular to axis 31. The axial distance between disks 37 may vary. In this example, the axial distance from one disk 37 to another is slightly greater than the axial dimension of each disk 37 from end wall 37b to end wall 37c.

At least one cylindrical wall magnet 39 is mounted in cylindrical wall 37a. Cylindrical wall magnet 39 may be annular or a plurality of magnets spaced around the circumference of cylindrical wall 37a. Cylindrical wall magnet 39 is configured to generate a magnetic field radially outward from disk cylindrical wall 37a. At least one end wall magnet 41 is mounted in each end wall 37b, 37c. End wall magnet 41 may be circular and coaxial with axis 31, or they may comprise an array spaced apart from each other in a circular pattern coaxial with axis 31. The end wall magnet 41 in disk upper end wall 37b is configured to generate an upward axially directed magnetic field from disk upper end wall 37b. The end wall magnet 41 in disk lower end wall 37c is configured to generate a downward axially directed magnetic field from disk lower end wall 37c.

A non rotating shell of can 43 surrounds motor end shaft 29 and disks 37. Shell 43 is a thin container of non magnetic material, which could be metals or polymers. Shell 43 has a motor end flange 45 that seals and rigidly secures shell 43 to the upper side of motor end adapter 23. Shell 43 comprises a plurality of disk receptacles 47, each of winch encloses an outer portion of one of the disks 37. Each disk receptacle 47 has an outer cylindrical wall 47a closely spaced to but not touching the cylindrical wall 37a of one of the disks 37. Each disk receptacle 47 has parallel end walk or surfaces 47b, 47c that join cylindrical wall 47a and are closely spaced to but not touching disk end walls 37b, 37c. An inner cylindrical wall 49 of shell 43 joins adjacent disk housings 47 to each other. Inner cylindrical wall 49 has an inner diameter slightly greater than motor end shaft 29 and an outer diameter much smaller than the outer diameter of each disk cylindrical wall 37a.

Shell 43 is a sealed container that is open at motor end flange 45 for fluid communication with dielectric lubricant in seal section 15 and motor 19 (FIG. 1). Shell 43 isolates the lubricant from well fluid in housing 27 surrounding shell 43. The magnetic fields of magnets 39, 41 transmit through shell 43.

A pump end shaft 51 extends through pump end adapter 25 into housing 27 along axis 31. A radial bearing 53 in pump end adapter 25 stabilizes the upper end of pump end shaft 51. Bearing 53 does not form a seal between pump end shaft 51 and pump end adapter 25. Pump end shaft 51 may be part of the drive shaft extending through pump 13 (FIG. 1), or it may be a separate shaft that couples with one or more splined couplings to the drive shaft within pump 13.

A generally cylindrical member, referred to herein as a rotor 55, mounts to the lower end of pump end shaft 51 for rotation therewith. One or more radial bearings 57 (two shown) are mounted between the outer diameter of rotor 55 and the inner diameter of housing 27. The outer diameter of rotor 55 is closely spaced to but does not touch the inner diameter of housing 27. Rotor 55 has a plurality of rectangular annular internal recesses 59, each of which closely receives but does not touch one of the shell disk receptacles 47. Each recess 59 has a cylindrical wall 59a that joins two parallel flat end walls or surfaces 59b, 59c. Recess cylindrical wall 59a is located a short distance radially outward from shell disk receptacle cylindrical wall 47a. Recess end wall 59b is parallel with, and spaced closely to shell disk, receptacle end wall 47b. Recess end wall 59c is parallel with and spaced closely to shell disk receptacle end wall 47c. Recesses 59 are in fluid communication with each other.

At least one cylindrical wall magnet 61 is mounted in each, recess cylindrical wall 59a. Cylindrical wall magnet 61 may comprise an annular magnet or a plurality of magnets spaced around the circumference of recess cylindrical wall 59a. Cylindrical wall magnet 61 is opposite in polarity to and within the magnetic field of disk cylindrical wall magnet 39. At least one end wall magnet 63 is mounted in each recess end wall 59b and 59e. End wall magnet 63 may comprise a circular magnet encircling and concentric with axis 31. Alternately, end wall magnet 63 may be a plurality of magnets spaced apart in a circular pattern concentric with axis 31. Each end wall magnet 63 is within the magnetic field of and opposite in polarity to one of the disk end wall magnets 41.

Rotor 55 has a plurality of cylindrical bands 65, each located between adjacent ones of the recesses 59. Bach band 65 has an inner diameter slightly greater than the outer diameter of shell inner cylindrical walls 49. The inner diameter of each band 65 is much smaller than the inner diameter of each recess cylindrical wall 59c.

A non rotating bearing carrier 67 is mounted to an upper end of motor end shaft 29. Bearing carrier 67 may have the same configuration as disks 37, however if does not rotate with motor end shaft 29 or with rotor 55. Bearing carrier 67 is located within an annular recess 69 in rotor 55 and in sealing non-rotating contact with an upper flange 68 of shell 43. A radial bearing 71 located between an inner diameter of bearing carrier 67 and motor end shaft 29 provides radial support for the upper end of motor end shaft 29.

The upper end of motor end shaft 29 is located within an upper end recess 74 of smaller diameter than each bearing carrier recess 69. Bearing carrier 67 has a bridge 76 that extends over the top of motor end shaft 29, axially separating motor end shaft 29 from pump end shaft 51. A radial bearing 73 is located between bridge 76 and rotor 55 within an upper end recess 74, to radially stabilize bearing carrier 67. Motor end shaft 29 and rotor 55 are both free to rotate relative to bearing carrier 67, which does not rotate. A pump end shaft thrust bearing 75 is positioned between the upper end of motor end shaft 29 and bearing carrier bridge 76. The upper end of rotor 55 extends over bearing carrier bridge 76 and connects to pump end shaft 51.

In operation, motor 19 rotates motor end shaft 29 and disks 37. The magnetic attraction between cylindrical wall magnets 39 and 61 and the magnetic attraction between end wall magnets 41 and 63 cause rotor 55 to rotate in unison. The magnetic attraction of end wall magnets 41, 63 provide additional flux to the magnetic flux created between the cylindrical wall magnets 39, 61. Pump end shall 51 rotates with rotor 55 and drives pump 13. Lubricant within motor 19 and seal section 15 will be in communication with lubricant in shell 43 via clearances within radial bearing 33 in motor end adapter 23 and the clearances around motor end shaft 29. The same dielectric lubricant could be pre-filled in housing 21 around rotor 55, into the interior of rotor 55 and on the exterior of shell 43. During operation, well fluid will communicate through bearing 53 in pump end adapter 25 with the fluid around rotor 55 and the interior of rotor 55 surrounding shell 43. Radial bearings 53, 57 and 73 will be in immersed in fluid that may contain well fluid. Thrust bearings 35 and 75 will be immersed only in the motor dielectric lubricant.

Seal section 15 will reduce a pressure difference between well fluid surrounding ESP 11 and the pressure of lubricant in shell 43 and motor 19. With seal section 15 below magnetic coupling 17, as in FIG. 1, the dielectric lubricant within the interior of a bag or bellows inside of seal section 15, would be in direct communication with motor lubricant in motor 19. The lubricant within seal section 17 would also be in communication with the interior of shell 43 via bearing 33. The lubricant within shell 43 would thus be at the hydrostatic pressure of fluid in the well. The fluid on the exterior of shell 43 would be substantially the same hydrostatic pressure.

Figure 3:
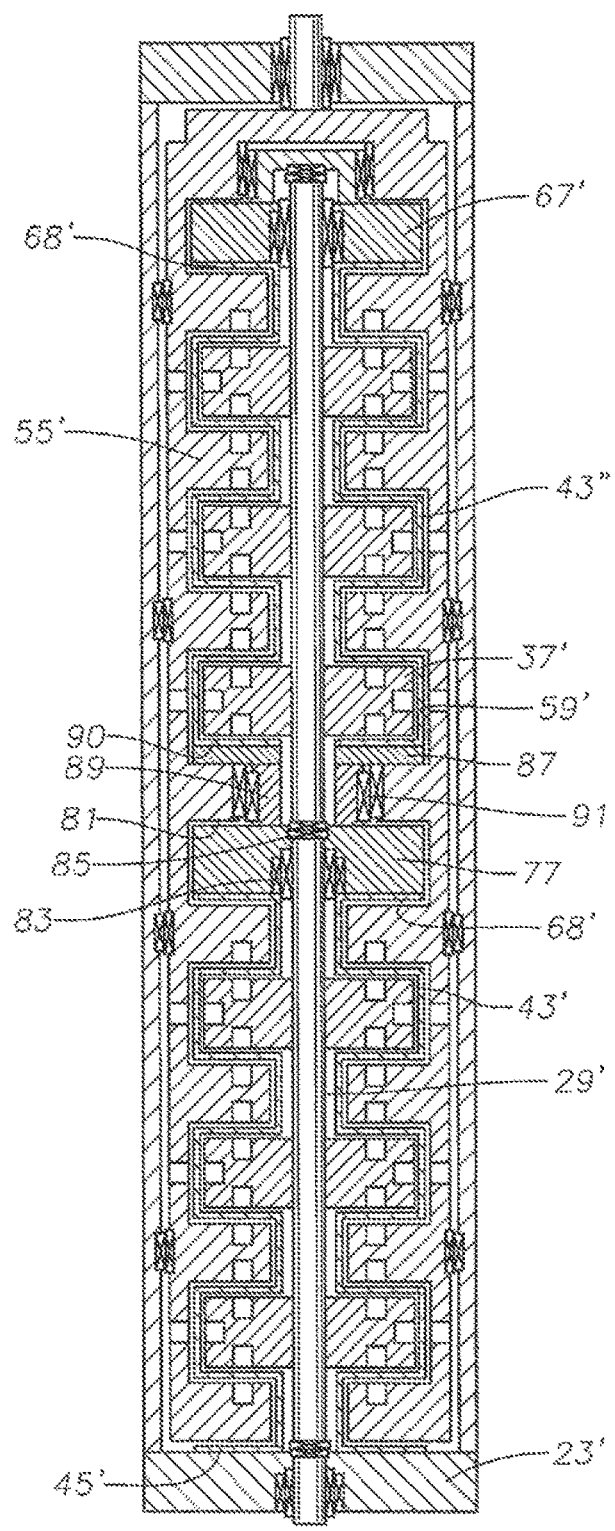
FIG. 3 is a cross sectional view of an alternate embodiment of the magnetic coupling of FIG. 2.

In FIG. 3, many of the features are the same as those discussed in connection with FIG. 2 and will not be discussed again. The components that are the same will use the same numerals as in FIG. 2 followed by a prime symbol. In this embodiment, one or more intermediate bearing carriers 77 (one shown) is positioned between motor end adapter 23' and upper bearing carrier 67'. Intermediate bearing carrier 77 is located in a mating recess 81 within rotor 55'. A radial bearing 83 between motor end shaft 29' and intermediate bearing carrier 77 provides radial stability. The shell is formed in separate upper and lower portions 43' and 43" in this embodiment, the upper and lower portions 43' and 43" being in fluid communication with each other and with lubricant in seal section 15 and motor 19 (FIG. 1).

An intermediate thrust bearing 85 may be mounted between intermediate bearing carrier 77 and motor end shaft 29. Intermediate bearing carrier 77 is rigidly connected to a non rotating support plate 87 located in the next upward rotor recess 59' by a neck 89. Neck 89 is sealingly and rigidly joined both to support plate 87 and to intermediate bearing carrier 77. The lower side of support plate 87 does not touch the upward facing shoulder of rotor 55' in the recess 59' in which it is located. Also, the rotating disk 37' just above support plate 87 is separated from support plate 87 by lower flange 90 of upper shell portion 43". Lower flange 90 is sealingly bonded to the upper side of support plate 87. A radial bearing 91 is located between neck 89 and an inner portion of rotor 55'.

The upper flange 68' on shell lower portion 43' is in sealing non rotating contact with the lower side of intermediate bearing carrier 77. The lower flange 45' of lower shell 43' is in non rotating sealing contact with motor end adapter 23'. The upper flange 68" on upper shell 43" is in non rotating, sealing contact with the lower side of upper bearing carrier 67'. Motor lubricant in shell portions 43', 43" is in fluid communication via the interior of neck 89 and clearances in bearings 83 and 85. The motor lubricant in shell portions 43', 43" is isolated from fluid on the exterior of the shell portions by the flowing sealing engagements lower flange 45' with motor adapter 23'; upper flange 68' with intermediate bearing carrier 77; lower flange 90 with support plate 87; and upper flange 68" with upper bearing carrier 67'.

While the disclosure has been shown in only two of its forms, it should be apparent to those skilled in the art that it is not so limited, but is susceptible to various changes without departing from the disclosure. For example, the schematic drawings show the rotor as being a single piece member; for manufacturing purposes, it could be made up of a number of components. The magnetic couplings shown could be inverted.

The invention claimed is:

1. An electrical submersible pump assembly, comprising:
a rotary pump having a rotatably driven pump shaft;
a motor having a motor shaft that is rotated by the motor and extends along an axis of the pump assembly;
a plurality of motor shaft disks mounted to the motor shaft for rotation therewith and spaced axially apart from each other, each disk having first and second disk end walls joined by a disk cylindrical wall;
a plurality of motor shaft magnets mounted in the first and second disk end walls of each of the disks;
a pump shaft rotor mounted to the pump shaft for rotation therewith, the rotor having a plurality of annular bands located between adjacent ones of the disks, each of the annular bands having first and second band end walls joined by a band cylindrical wall;
a plurality of magnets on the first and second band end walls of each of the bands that magnetically interact with the magnets on the second and first disk end walls, respectively, of each of the disks, to impart rotation of the motor shaft to the rotor; wherein
the rotor has a plurality of annular recesses, each of the recesses receiving one of the disks, each of the annular recesses having a recess cylindrical wall joining adjacent ones of the bands; and
magnets on the disk cylindrical walls and on the recess cylindrical walls that interact magnetically with each other to facilitate imparting rotation of the motor shaft to the pump shaft.

2. The assembly according to claim 1, wherein:
the first and second disk end walls and the first and second band end walls are flat and perpendicular to the axis.

3. The assembly according to claim 1, further comprising:
a magnetic coupling housing having a housing cylindrical wall extending around and concentric with the rotor, the housing having a motor end adapter on one end of the housing cylindrical wall coupled to the motor and a pump end adapter on an another end of the housing cylindrical wall coupled to the pump;
the motor shaft extending through an opening in the motor end adapter;
the pump shaft extending through an opening in the pump end adapter; and
a thrust bearing at the opening in the motor end adapter and in engagement with the motor shaft.

4. The assembly according to claim 1, further comprising:
a magnetic coupling housing having a housing cylindrical wall extending around and concentric with the rotor, the housing having a motor end adapter on one end of the housing cylindrical wall and a pump end adapter on an another end of the housing cylindrical wall;
the motor shaft extending through an opening in the motor end adapter;
the pump shaft extending through an opening in the pump end adapter; and
a thrust bearing located between the motor end adapter and the pump end adapter and in engagement with the motor shaft.

5. The assembly according to claim 1, further comprising:
axial gaps between the disk end walls and adjacent ones of the first and second band end walls;
outer cylindrical gaps between the disk cylindrical walls and adjacent ones of the band cylindrical walls;
inner cylindrical gaps exist between the band cylindrical wall of each of the bands and the motor shaft; and
a non rotating shell of non ferrous material located in the axial gaps and the inner and outer cylindrical gaps and separating the magnets on the disk first and second end walls from the magnets on the rotor second and first end walls, respectively, the shell having a sealed interior in fluid communication with lubricant in the motor.

6. The assembly according to claim 1, wherein the recess cylindrical walls have inner diameters greater than inner diameters of the band cylindrical walls.

7. The assembly according to claim 1, wherein the disks and the bands have rectangular cross-sections when viewed in an axial section plane.

8. The assembly according to claim 1, further comprising:
a magnetic coupling housing having a housing cylindrical wall surrounding and concentric with the rotor, the housing having a motor end adapter on one end of the housing cylindrical wall coupled to the motor and a pump end adapter on an another end of the housing cylindrical wall coupled to the pump;
the motor shaft extending through an opening in the motor end adapter;
the pump shaft extending through an opening in the pump end adapter;
a shell of non ferrous material having a motor end flange non rotatably mounted to the motor end adapter;
the shell having a plurality of inward facing recesses, each of the shell recesses receiving one of the disks, the shell having a plurality of outward facing recesses, each receiving one of the bands; and
the shell being sealed and having an interior in fluid communication with lubricant in the motor.

9. An electrical submersible pump assembly, comprising:
a rotary pump having a rotatably driven pump shaft;
a motor having a motor shaft that is rotated by the motor and extends along an axis of the pump assembly;
a plurality of motor shaft disks mounted to the motor shaft for rotation therewith and spaced axially apart from each other, each disk having upward and downward facing disk surfaces joined by an outward facing disk cylindrical surface;
a plurality of motor shaft magnets mounted in each of the disk cylindrical surfaces and in the upward and downward facing disk surfaces;
a pump shaft rotor mounted to the pump shaft for rotation therewith, the rotor having a plurality of annular bands axially separated from each other by recesses, each of the bands having upward and downward facing band surfaces joined by an inward facing band cylindrical surface, each of the recesses having an inward facing recess cylindrical surface;
a plurality of rotor magnets mounted in each of the recess cylindrical surfaces and in the upward and downward facing band surfaces;
each of the disks extending into one of the recesses, juxtaposing the disk cylindrical surface of each of the disks with one of the recess cylindrical surfaces, juxtaposing the disk upward facing surface with one of the downward facing band surfaces and juxtaposing the disk downward facing surface with one of the upward facing band surfaces;

a plurality of magnets on the cylindrical surfaces of each of the recesses for interacting with the magnets on the disk cylindrical surfaces; and a plurality of magnets on the upward and downward facing band surfaces for interacting with the magnets on the downward and upward facing disk surfaces.

10. The assembly according to claim 9, wherein the upward and downward facing disk surfaces and the upward and downward facing band surfaces are flat and perpendicular to the axis.

11. The assembly according to claim 9, wherein the magnets on the upward and downward facing disk surfaces are located a same radial distance from the axis as the magnets on the upward and downward facing band surface.

12. The assembly according to claim 9, further comprising:
an axial gap between each of the upward facing disk surfaces and the downward facing band surface of an adjacent one of the bands;
an axial gap between each of the downward facing disk surfaces and the upward facing band surface of an adjacent one of the bands;
an outer cylindrical gap between each of the disk cylindrical surfaces and an adjacent one of the recess cylindrical surfaces; and
an inner cylindrical gap between each of the band cylindrical surfaces and the motor shaft.

13. The assembly according to claim 12, further comprising:
a non rotating shell of non ferrous material located in the axial gaps and the inner and outer cylindrical gaps, the shell having a sealed interior in fluid communication with lubricant in the motor.

14. The assembly according to claim 9, further comprising:
a magnetic coupling housing having a housing cylindrical wall surrounding and concentric with the rotor, the housing having a motor end adapter on one end of the housing cylindrical wall and a pump end adapter on an another end of the housing cylindrical wall;
the motor shaft extending through an opening in the motor end adapter;
the pump shaft extending through an opening in the pump end adapter; and
an intermediate thrust bearing located between the motor end adapter and the pump end adapter and in engagement with the motor shaft.

15. An electrical submersible pump assembly, comprising:
a rotary pump having a rotatably driven pump shaft;
a motor having a motor shaft that is rotated by the motor and extends along an axis of the pump assembly;
a magnetic coupling between the motor shaft and the pump shaft, comprising:
a plurality of motor shaft disks mounted to the motor shaft for rotation therewith and spaced axially apart from each other, each disk having parallel first and second end walls joined by a cylindrical wall, the end walls of each of the disks facing and being spaced axially from the end walls of adjacent ones of the disks;
a plurality of motor shaft magnets mounted in the cylindrical wall and in the first and second end walls of each of the disks;

a non rotating shell of non magnetic material sealingly mounted to an end of the motor, the shell having an interior in fluid communication with lubricant contained in the motor, the shell having a plurality of disk receptacles axially spaced apart from each other, each of the disk receptacles having parallel first and second end walls joined by a cylindrical wall;
the first end wall of each of the disk receptacles being closely spaced to the first end wall of one of the disks, the second end wall of each of the disk receptacles being closely spaced to the second end wall of said one of the disks, and the cylindrical wall of each of the disk receptacles being closely spaced to the cylindrical wall of said one of the disks;
the shell having a plurality of inner cylindrical walls located between and joining each of the disk receptacles, the inner cylindrical walls having smaller inner diameters than inner diameters of the cylindrical walls of the disk receptacles and extending around the motor shaft between each of the disks;
a pump shaft rotor mounted to the pump shaft for rotation therewith, the rotor having a plurality of annular recesses axially spaced apart from each other, each of the recesses having a cylindrical wall extending around the cylindrical wall of one of the disk receptacles of the shell, and parallel first and second end walls closely spaced to the first and second end walls, respectively, of said one of the disk receptacles;
a plurality of annular bands on the rotor, each of the annular bands being located between adjacent ones of the recesses, each of the annular bands having a cylindrical wall closely spaced to one of the inner cylindrical walls of the shell; and
a plurality of magnets on the cylindrical wall and on the first and second end walls of each of the bands for interacting with the magnets on the disks to cause the pump shaft to rotate in unison with the motor shaft.

16. The assembly according to claim 15, further comprising:
a non rotating magnetic coupling housing having a housing cylindrical wall surrounding and concentric with the rotor, the housing having a motor end adapter on one end of the housing cylindrical wall and a pump end adapter on an another end of the housing cylindrical wall;
the motor shaft extending through an opening in the motor end adapter;
the pump shaft extending through an opening in the pump end adapter; and
wherein the shell has a flange rigidly secured to the motor end adapter.

17. The assembly according to claim 16, further comprising:
an intermediate thrust bearing located between the motor end adapter and the pump end adapter and in engagement with the motor shaft.

18. The assembly according to claim 15, wherein:
the first and second end walls of each of the disks and the first and second end walls of each of the bands are flat and perpendicular to the axis.

19. The assembly according to claim 15, wherein the disks and the bands have rectangular cross-sections when viewed in an axial section plane.

* * * * *

UNITED STATES PATENT AND TRADEMARK OFFICE
CERTIFICATE OF CORRECTION

PATENT NO. : 10,208,755 B2
APPLICATION NO. : 14/817344
DATED : February 19, 2019
INVENTOR(S) : Ryan P. Semple, Arturo L. Poretti and David Tanner It is certified that error appears in the above-identified patent and that said Letters Patent is hereby corrected as shown below:

In the Specification

In Column 1, Line 24, reads: "between the motor and the pump reduce a pressure differ-" - It should read: --between the motor and the pump to reduce a pressure differ- --;

In Column 1, Line 40, reads: "past a shall seal remains a problem." - It should read: --past a shaft seal remains a problem.--;

In Column 1, Line 44, reads: "An electrical submersible pomp assembly includes a" - It should read: --An electrical submersible pump assembly includes a--;

In Column 1, Line 54, reads: "disks. A pump shall rotor mounted to the pump shaft for" - It should read: --disks. A pump shaft rotor mounted to the pump shaft for--;

In Column 1, Line 62, reads: "impart rotation of the motor shall to the rotor" - It should read: --impart rotation of the motor shaft to the rotor--;

In Column 2, Line 13, reads: "and adapter and in engagement with the motor shaft." - It should read: --end adapter and in engagement with the motor shaft.--;

In Column 3, Line 62, reads: "13 (FIG. 1). A tabular housing 27 secures to and between" - It should read: --13 (FIG. 1). A tubular housing 27 secures to and between--;

In Column 4, Line 37, reads: "A non rotating shell of can 43 surrounds motor end shaft" - It should read: --A non rotating shell or can 43 surrounds motor end shaft--;

In Column 4, Line 42, reads: "a plurality of disk receptacles 47, each of winch encloses an" - It should read: --a plurality of disk receptacles 47, each of which encloses an--;

Signed and Sealed this
Twentieth Day of October, 2020

Andrei Iancu
*Director of the United States Patent and Trademark Office*

CERTIFICATE OF CORRECTION (continued)
U.S. Pat. No. 10,208,755 B2

In Column 4, Line 46, reads: "Each disk receptacle 47 has parallel end walk or surfaces" - It should read: --Each disk receptacle 47 has parallel end wall or surfaces--;

In Column 4, Line 49, reads: "cylindrical wall 49 of shell 43 joins adjacent disk housings" - It should read: --cylindrical wall 49 of shell 43 joins adjacent disk receptacles--;

In Column 5, Line 63, reads: "wall magnets 41 and 63 cause rotor 55 to rotate in unison." - It should read: --wall magnets 41 and 63 causes rotor 55 to rotate in unison.--;

In Column 5, Line 64, reads: "The magnetic attraction of end wall magnets 41, 63 provide" - It should read: --The magnetic attraction of end wall magnets 41, 63 provides--;

In Column 5, Line 66, reads: "cylindrical wall magnets 39, 61. Pump end shall 51 rotates" - It should read: --cylindrical wall magnets 39, 61. Pump end shaft 51 rotates--; and In the Claims In Column 9, Line 14, Claim 11 reads: "magnets on the upward and downward facing band surface." - It should read: --magnets on the upward and downward facing band surfaces.--.